United States Patent
Huang et al.

(10) Patent No.: US 10,094,050 B2
(45) Date of Patent: *Oct. 9, 2018

(54) FIBER AND METHOD OF MANUFACTURING THE SAME

(71) Applicant: INDUSTRIAL TECHNOLOGY RESEARCH INSTITUTE, Hsinchu (TW)

(72) Inventors: Cheng-Jyun Huang, Taoyuan (TW); Guang-Way Jang, Hsinchu (TW); Shu-Chen Li, Yuanli Township (TW); Po-Ju Chen, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,136

(22) Filed: Nov. 4, 2016

(65) Prior Publication Data

US 2017/0121859 A1    May 4, 2017

Related U.S. Application Data

(60) Provisional application No. 62/250,643, filed on Nov. 4, 2015.

(51) Int. Cl.
| | | |
|---|---|---|
| *D01F 6/84* | (2006.01) | |
| *C08G 63/80* | (2006.01) | |
| *C08G 63/181* | (2006.01) | |
| *C08G 63/66* | (2006.01) | |
| *C08G 63/672* | (2006.01) | |

(52) U.S. Cl.
CPC ............ *D01F 6/84* (2013.01); *C08G 63/181* (2013.01); *C08G 63/66* (2013.01); *C08G 63/672* (2013.01); *C08G 63/80* (2013.01)

(58) Field of Classification Search
CPC .. C08G 63/199; C08G 18/3218; C08G 63/58; C08G 63/66; C08G 63/676; C08G 64/0208; G02B 5/3033; G02B 5/3083
See application file for complete search history.

(56) References Cited

U.S. PATENT DOCUMENTS

| | | | | |
|---|---|---|---|---|
| 2,945,008 A | * | 7/1960 | Caldwell | C08G 18/3218 521/174 |
| 4,004,878 A | * | 1/1977 | Magosch | C08G 63/672 528/300 |
| 6,350,822 B1 | | 2/2002 | Van Diepen et al. | |
| 6,447,859 B2 | | 9/2002 | Oguro et al. | |
| 8,895,654 B2 | | 11/2014 | Crawford et al. | |
| 9,023,953 B2 | | 5/2015 | Nagano et al. | |
| 2010/0174044 A1 | * | 7/2010 | Eritate | C08G 63/676 528/272 |
| 2015/0064383 A1 | | 3/2015 | Kriegel et al. | |
| 2017/0121859 A1 | * | 5/2017 | Huang | D01F 6/84 |

FOREIGN PATENT DOCUMENTS

| | | |
|---|---|---|
| CN | 101704942 A | 5/2010 |
| CN | 101831059 A | 9/2010 |
| CN | 102432847 A | 5/2012 |
| CN | 103665788 A | 3/2014 |
| CN | 104321363 A | 1/2015 |
| JP | 2009-286743 A | 12/2009 |
| WO | WO 2012/005647 A1 | 1/2012 |
| WO | WO 2012/005648 A1 | 1/2012 |
| WO | WO 2014/204313 A1 | 12/2014 |
| WO | WO 2015/031910 A1 | 3/2015 |

OTHER PUBLICATIONS

F. M. Medvedeva et al "Mixed polyesters of ethylene glycol with 2,5-furandicarboxylic and terephthalic acids", 1963.*
Burgess et al., "Chain Mobility, Thermal, and Mechanical Properties of Poly(ethylene furanoate) Compared to Poly(ethylene terephthalate)," Macromolecules, 2014 (published Feb. 3, 2014), vol. 47, p. 1383-1391.
Forsythe et al., "Rheological properties of high melt strength poly(ethylene terephthalate) formed by reactive extrusion," Journal of Applied Polymer Science, vol. 100, 2006, p. 3646-3652.
Hudson et al., "Synthesis and Characterization of Nonlinear PETs Produced via a Balance of Branching and End-Capping," Macromolecules, 2000 (published on web Nov. 18, 2000), vol. 33, No. 25, p. 9255-9261.
Jansen et al., "Reaction Kinetics of the Incorporation of 2,2-Bis[4-(2-hydroxyethoxy)phenyl]propane in Poly(butylene terephthalate) via Solid-State Polymerization," Macromolecules, 2005 (published on web Mar. 8, 2005), vol. 38, No. 7, p. 2659-2664.
Raffa et al., "Chain extension and branching of poly(ethylene terephthalate) (PET) with di- and multifunctional epoxy or isocyanate additives: An experimental and modelling study," Elsevier, Reactive & Functional Polymers, vol. 72, 2012 (available online Oct. 24, 2011), p. 50-60.

(Continued)

*Primary Examiner* — Ling Siu Choi
*Assistant Examiner* — Gennadiy Mesh
(74) *Attorney, Agent, or Firm* — Birch, Stewart, Kolasch & Birch, LLP

(57) ABSTRACT

A fiber includes polyester copolymerized with diacid monomer, esterified diacid monomer or combination thereof with a polyol monomer. The diacid monomer, esterified diacid monomer or combination thereof includes (1) furan dicarboxylic acid, dialkyl furandicarboxylate, or combination thereof or (2) furan dicarboxylic acid, dialkyl furandicarboxylate, or combination thereof and spiro-diacid. The polyol monomer includes (3) $C_2$-$C_{14}$ polyol or (4) $C_2$-$C_{14}$ polyol and spiro-diol. The diacid monomer, esterified diacid monomer or combination thereof and the polyol monomer meet: (a) diacid monomer, esterified diacid monomer or combination thereof includes (2) furan dicarboxylic acid, dialkyl furandicarboxylate, or combination thereof and spiro-diacid, (b) polyol monomer includes (4) $C_2$-$C_{14}$ polyol and spiro-diol, or (c) a combination thereof. The polyester has a viscosity at 30° C. of 0.5 dL/g to 1.5 dL/g, and an amount of spiro-diol or spriro-diacid is 500 ppm to 2000 ppm based on a weight of the furan dicarboxylic acid, dialkyl furandicarboxylate, or the combination thereof.

14 Claims, No Drawings

(56) References Cited

OTHER PUBLICATIONS

Yoon et al., "Effect of multifunctional comonomers on the properties of poly(ethylene terephthalate) copolymers," Polymer International, vol. 51, 2002, p. 134-139.
Taiwanese Office Action and Search Report for Taiwanese Application No. 105135854, dated Mar. 28, 2017.
Chinese Office Action issued in the corresponding Chinese Application No. 201610959041.2, dated May 21, 2018.

* cited by examiner

FIBER AND METHOD OF MANUFACTURING THE SAME

CROSS REFERENCE TO RELATED APPLICATIONS

This application claims the benefit of U.S. Provisional Application No. 62/250,643 filed on Nov. 4, 2015, the entirety of which is incorporated by reference herein.

TECHNICAL FIELD

The technical field relates to a fiber and a method for manufacturing the same.

BACKGROUND

Polyethylene terephthalate (PET) has excellent properties and wide application, as it is a basic raw material in many industrial products. However, the raw materials of PET depend on a petroleum source, and biomass plastic seems to be a good choice to replace the PET. More research needs to focus on developing the biomass plastic, which may free up the world's precious, dwindling petroleum resources for more valuable applications in the future.

However, the material properties of the biomass plastic should be improved when it is processed. In other words, a biomass plastic with excellent processability and mechanical properties applied in a fiber is called for.

SUMMARY

One embodiment of the disclosure provides a fiber including a polyester, which is copolymerized of a diacid monomer, an esterified diacid monomer, or a combination thereof and a polyol monomer, wherein the diacid monomer, the esterified diacid monomer, or a combination thereof includes (1) furan dicarboxylic acid, dialkyl furandicarboxylate, or a combination thereof or (2) furan dicarboxylic acid, dialkyl furandicarboxylate, or a combination thereof and spiro-diacid, and the polyol monomer comprises (3) $C_2$-$C_{14}$ polyol or (4) $C_2$-$C_{14}$ polyol and spiro-diol, wherein the spiro-diol has a Formula (I):

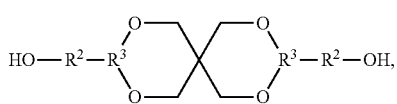

and the spiro-diacid has a Formula (II):

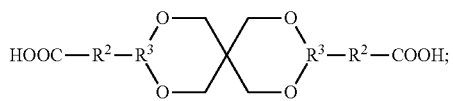

wherein each $R^2$ is independently single bond,

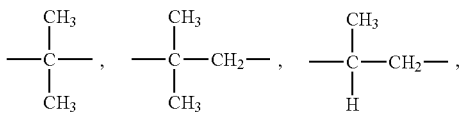

or $C_1$-$C_4$ linear alkylene; each $R^3$ is independently

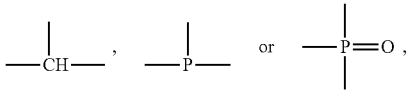

and wherein the diacid monomer, the esterified diacid monomer, or a combination thereof and the polyol monomer meet the following conditions: (a) the diacid monomer, the esterified diacid monomer or a combination thereof comprises (2) furan dicarboxylic acid, dialkyl furandicarboxylate, or a combination thereof and spiro-diacid, (b) the polyol monomer comprises (4) $C_2$-$C_{14}$ polyol and spiro-diol, or (c) a combination thereof. The polyester has an inherent viscosity at 30° C. of 0.5 dL/g to 1.5 dL/g.

One embodiment of the disclosure provides a method of manufacturing fiber, comprising: mixing a diacid monomer, an esterified diacid monomer, or a combination thereof with a polyol monomer to perform an esterification and a condensation polymerization for forming a prepolymer; and then performing a solid-state polymerization of the prepolymer to form the polyester, and spinning the polyester to form a fiber. The diacid monomer, the esterified diacid monomer, or a combination thereof includes (1) furan dicarboxylic acid, dialkyl furandicarboxylate, or a combination thereof or (2) furan dicarboxylic acid, dialkyl furandicarboxylate, or a combination thereof and spiro-diacid, and the polyol monomer comprises (3) $C_2$-$C_{14}$ polyol or (4) $C_2$-$C_{14}$ polyol and spiro-diol, wherein the spiro-diol has a Formula (I):

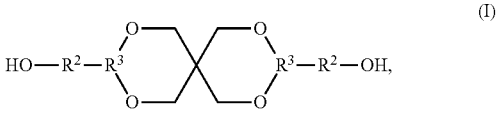

and the spiro-diacid has a Formula (II):

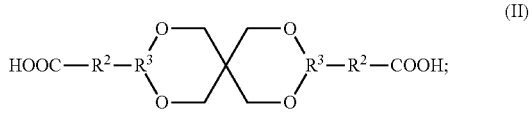

wherein each $R^2$ is independently single bond,

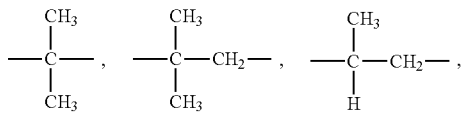

or $C_1$-$C_4$ linear alkylene; each $R^3$ is independently

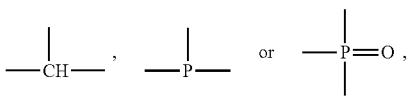

and wherein the diacid monomer, the esterified diacid monomer, or a combination thereof and the polyol monomer meet the following conditions: (a) the diacid monomer, the esterified diacid monomer or a combination thereof comprises (2) furan dicarboxylic acid, dialkyl furandicarboxylate, or a combination thereof and spiro-diacid, (b) the polyol monomer comprises (4) $C_2$-$C_{14}$ polyol and spiro-diol, or (c) a combination thereof. The polyester has an inherent viscosity at 30° C. of 0.5 dL/g to 1.5 dL/g.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

In one embodiment, a polyester is made by copolymerization of a diacid monomer, an esterified diacid monomer, or a combination thereof with a polyol monomer. In one embodiment, the diacid monomer, the esterified diacid monomer, or a combination thereof is mixed with the polyol monomer, and an esterification and a condensation polymerization of the mixture are performed to form a prepolymer. A solid-state polymerization of the prepolymer is performed to form the polyester.

In one embodiment, the diacid monomer, the esterified diacid monomer, or a combination thereof includes (1) furan dicarboxylic acid, dialkyl furandicarboxylate, or a combination thereof, or (2) furan dicarboxylic acid, dialkyl furandicarboxylate, or a combination thereof and spiro-diacid.

In one embodiment, the furan dicarboxylic acid includes 2,5-furan dicarboxylic acid, 3,4-furan dicarboxylic acid, 2,3-furan dicarboxylic acid, or a combination thereof. The dialkyl furandicarboxylate includes dimethyl furan-2,5-dicarboxylate, dimethyl furan-3,4-dicarboxylate, dimethyl furan-2,3-dicarboxylate, or a combination thereof. The spiro-diacid has a Formula (II):

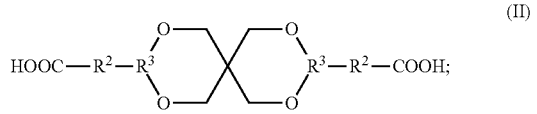

(II)

wherein each $R^2$ is independently single bond,

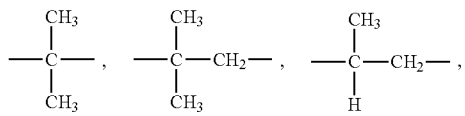

or $C_1$-$C_4$ linear alkylene, and each $R^3$ is independently

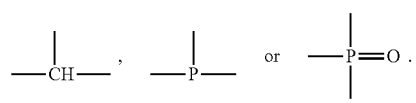

In one embodiment, the polyol monomer includes (3) $C_2$-$C_{14}$ polyol or (4) $C_2$-$C_{14}$ polyol and spiro-diol.

In one embodiment, the $C_2$-$C_{14}$ polyol includes ethylene glycol, 1,3-propylene glycol, glycerol, 1,4-butylene glycol, 1,5-pentylene glycol, neo-pentylene glycol, 1,6-hexylene glycol, 1,7-heptylene glycol, 1,8-octylene glycol, 1,9-nonylene glycol, decylene glycol, undecylene glycol, dodecylene glycol, tetradecylene glycol, rosin glycol, isosorbide, 2,5-furandiol, or a combination thereof. The spiro-diol has a Formula (I):

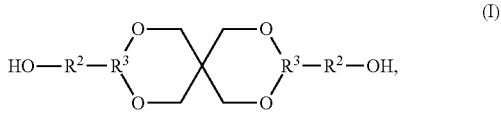

(I)

wherein each $R^2$ is independently single bond,

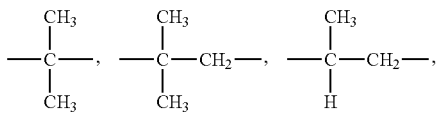

or $C_1$-$C_4$ linear alkylene, and each $R^3$ is independently

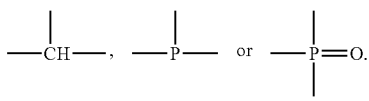

In one embodiment, the diacid monomer, the esterified diacid monomer, or a combination thereof, and the polyol monomer are selected to meet condition (a), condition (b), or condition (c) a combination thereof. In condition (a), the diacid monomer, the esterified diacid monomer, or a combination thereof includes (2) furan dicarboxylic acid, dialkyl furandicarboxylate, or a combination thereof and spiro-diacid. In condition (b), the polyol monomer includes (4) $C_2$-$C_{14}$ polyol and spiro-diol.

In one embodiment, the esterification includes transesterification and direct esterification. The esterification and the condensation polymerization can be catalyzed by an appropriate catalyst, and the catalyst content ranges from about 25 ppm to 500 ppm on the basis of the reactants. In one embodiment, the catalyst can be a metal catalyst that is tin-based, antimony-based, gallium-based, aluminum-based, titanium-based, germanium-based, lithium-based, magnesium-based, manganese-based, cobalt-based, or a combination thereof. For example, the catalyst can be titanium-based solid catalyst, titanium isopropoxide, titanium isobutoxide, or a combination thereof. The esterification and the condensation polymerization can be respectively reacted at a temperature of about 170° C. to 260° C. for a period of about 1 hour to 8 hours.

After the esterification and the condensation polymerization, the prepolymer is obtained for further solid-state polymerization. The solid-state polymerization is performed at a temperature of about 170° C. to 210° C. for a period of about 4 hours to 120 hours (or about 16 hours to 56 hours). The solid-state polymerization easily causes yellowing of thermal degradation (and melting adhesive lump) due to an overly high temperature or an overly long period. The molecular weight of the branched polyester cannot be efficiently increased by an overly low temperature or an overly short period of the solid-state polymerization.

In one embodiment, the prepolymer is further re-crystallized before the solid-state polymerization. The re-crystallization is performed at a temperature of about 110° C. to 170° C. (e.g. about 130° C. to 160° C.) for a period of about 0.5 hour to 2 hours. Optionally, the solid obtained from the re-crystallization is cracked to form powder for the solid-state polymerization.

In one embodiment, the spiro-diacid or the spiro-diol is ring-opened to branch the prepolymer for forming a branched polyester. The branched polyester has a higher molecular weight and a higher zero shear viscosity than the polyester before being branched. For example, when $R^2$ is

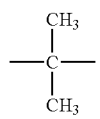

and $R^3$ is

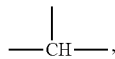

the solid-state polymerization is shown below, in which P' is the other parts of the polyester.

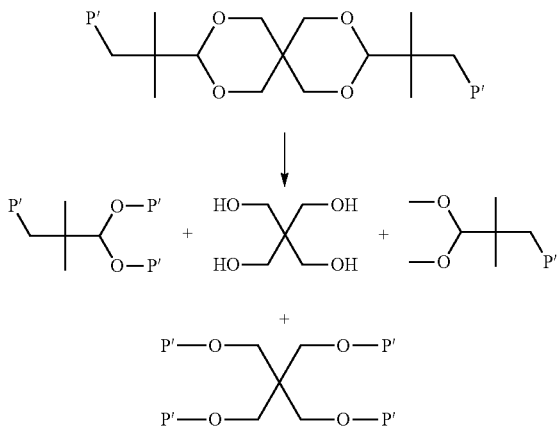

In one embodiment, the spiro-diacid or spiro-diol may make the polyester have excellent zero shear viscosity after the solid-state polymerization. The polyester is beneficial for a molding process for several products (e.g. container). The polyester may mitigate or eliminate the problem of parison sagging during the molding process.

In one embodiment, the diacid monomer, the esterified diacid monomer, or a combination thereof includes 1 part by mole of (1) furan dicarboxylic acid, dialkyl furandicarboxylate, or a combination thereof, and the polyol monomer includes 1 to 3 parts by mole of (4) $C_2$-$C_{14}$ polyol and Spiro-diol. The furan dicarboxylic acid, dialkyl furandicarboxylate, or a combination thereof and the spiro-diol have a molar ratio of 1:0.0003023 to 1:0.0012092. Too much spiro-diol easily results in gelation, which is unfavorable in processing. Too little spiro-diol cannot efficiently enhance the zero shear viscosity of the product.

In one embodiment, the diacid monomer, the esterified diacid monomer, or a combination thereof includes 1 part by mole of (2) furan dicarboxylic acid, dialkyl furandicarboxylate, or a combination thereof and spiro-diacid, and the polyol monomer includes 1 to 3 parts by mole of (3) $C_2$-$C_{14}$ polyol. The furan dicarboxylic acid, dialkyl furandicarboxylate, or a combination thereof and the spiro-diacid have a molar ratio of about 99.998:0.002 to 99.9999:0.0001, or about 99.9985:0.0015 to 99.9999:0.0001. Too much spiro-diacid easily results in gelation, which is unfavorable in processing. Too little spiro-diacid cannot efficiently enhance the zero shear viscosity of the product.

In one embodiment, the branched polyester can be further blended with another polyester to form a blend if necessary.

The polyester may serve as a fiber, and the polyester has an inherent viscosity at 30° C. of about 0.5 dL/g to 1.5 dL/g. A polyester with an overly high inherent viscosity has a poor flowability, which needs a higher temperature for melt spinning the polyester, and the polyester easily degrade at the higher temperature. A polyester with an overly low inherent viscosity has an overly low molecular weight, which means poor mechanical properties. In one embodiment, the polyester can be spun to form a fiber by melt spinning, dry-jet wet spinning, emulsion or suspension spinning, fibrillation spinning, or another suitable spinning method. In one embodiment, the fiber can be collected at a winding rate of about 100 m/min to 3000 m/min, or a winding rate of about 300 m/min to 1500 m/min. An overly fast winding rate may break the fiber. An overly slow winding rate gives the fiber an insufficient elongation degree, low crystallinity, and low mechanical strength. The fiber can be used directly, or stretched further at about 60° C. to 150° C. The stretched fiber has a length about 1.1 to 5 times that of the fiber before the stretching step. The stretching step may further improve the breaking elongation and the crystallinity of the fiber. In one embodiment, the fiber has a breaking elongation of about 5% to 250%, or a breaking elongation of about 14% to 210%. A fiber with an overly low breaking elongation is easily broken. In one embodiment, the fiber has a crystallinity of about 5 J/g to 60 J/g. A fiber with an overly high crystallinity may have a low breaking elongation, insufficient flexibility, and being difficult to color. A fiber with an overly low crystallinity may have an insufficient fiber strength.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

In following experiments, the rheological behavior of the polyesters at steady-state was measured by Anton Paar Physica MCR 301 rheometer, in which the shear rate was measured between 1000 s$^{-1}$ to 0.001 s$^{-1}$ in a parallel plate geometry with an interval of 1.0 mm. Each of a series of measurement points (total 15 points) was measured for 50 seconds. When the polyol monomer of the polyester was ethylene glycol, the above measurement was performed at 250° C. When the polyol monomer of the polyester was propylene glycol or butylene glycol, the above measurement was performed at 210° C.

Example 1

1 part by mole of dimethyl furan-2,5-dicarboxylate, 2.5 parts by mole of ethylene glycol, 500 ppm of 3,9-bis(1,1- dimethyl-2-hydroxyethyl)-2,4,8,10-tetraoxaspiro[5.5]undecane (abbreviated as SPG monomer, on the weight basis of the dimethyl furan-2,5-dicarboxylate, about 0.03023 mol %), and 100 ppm of titanium-based solid catalyst (C-94, commercially available from World Chem Industries Co., Ltd, on the weight basis of the dimethyl furan-2,5-dicarboxylate) were put into a reaction tank. A condensing device and a methanol collecting cylinder were assembled with the reaction tank. The reaction tank was flushed and filled with nitrogen, and the mixture was heated to 190° C. in a salt bath, and stirred at 200 rpm by a rotator to perform a transesterification. After the catalyst was completely dissolved, methanol started to condense on the condenser. The transesterification was performed continuously for 3 hours, the condensed methanol was removed, and 0.1 wt % of an anti-oxidant (Irganox 1010, commercially available from BASF, on the weight basis of the dimethyl furan-2,5-dicarboxylate) was then added into the reaction tank. The pressure of the reaction tank was then gradually reduced to 50 torr in 30 minutes to remove the excess ethylene glycol. The salt bath temperature was gradually heated to 230° C., and the reaction pressure was gradually reduced to less than 1 torr to perform a condensation polymerization for 60 minutes. Finally, the vacuum of the condensation polymerization was broken by nitrogen, and the heating and stirring were stopped. The cap of the reaction tank was then opened, and a viscous product was then obtained.

The viscous product was re-crystallized at 150° C. for 1 hour, then crushed by a crushing machine, and then separated by a sieve screen to collect powder with a particle size of less than 25 mesh for further solid-state polymerization. The powder was put into a reaction tank, and heated to 200° C. in a salt bath to perform the solid-state polymerization for 48 hours, in which the reaction pressure is less than 1 torr. Finally, a branched polyester was obtained, and its properties such as inherent viscosity (at 30° C.) and rheological behavior were analyzed and are tabulated in Table 1.

Examples 2 and 3

Examples 2 and 3 were similar to Example 1, and the differences in Examples 2 and 3 were the SPG monomer amounts. The SPG monomer amounts and the product properties are tabulated in Table 1.

Comparative Example 1

Comparative Example 1 was similar to Example 1, and the difference in Comparative Example 1 was free of the SPG monomer. The product properties are tabulated in Table 1.

Comparative Example 2

Comparative Example 2 was similar to Example 1, and the difference in Comparative Example 2 was that the SPG monomer was replaced with 1000 ppm of another spiro-compound (Irgafos 126, commercially available from BASF, on the weight basis of the dimethyl furan-2,5-dicarboxylate). The product properties are tabulated in Table 1. The chemical structure of Irgafos 126 is shown below.

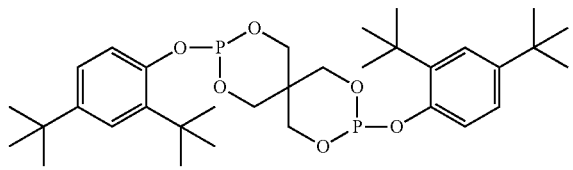 [SMILES: CC(C)(C)c1ccc(OP2OCC3(CO2)COP(Oc2ccc(C(C)(C)C)cc2C(C)(C)C)OC3)c(C(C)(C)C)c1]

Comparative Example 3

Comparative Example 3 was similar to Example 1, and the difference in Comparative Example 3 was that the SPG monomer was replaced with 1000 ppm of another aromatic compound (Irgafos 168, commercially available from BASF, on the weight basis of the dimethyl furan-2,5-dicarboxylate). The product properties are tabulated in Table 1. The chemical structure of Irgafos 168 is shown below.

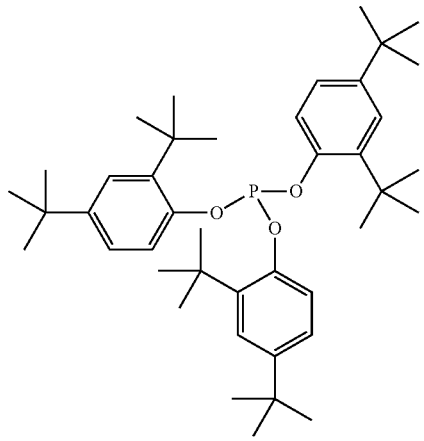 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

TABLE 1

|  | Example 1 | Example 2 | Example 3 | Comparative Example 1 | Comparative Example 2 | Comparative Example 3 |
|---|---|---|---|---|---|---|
| SPG monomer (ppm) | 500 | 1000 | 1500 | 0 | 0 (1000 ppm Irgafos 126) | 0 (1000 ppm Irgafos 168) |
| Solid-state polymerization period (hrs) | 48 | 48 | 48 | 48 | 48 | 48 |
| Inherent viscosity before solid-state polymerization (dL/g) | 0.280 | 0.276 | 0.255 | 0.283 | 0.275 | 0.271 |

TABLE 1-continued

| | Example 1 | Example 2 | Example 3 | Comparative Example 1 | Comparative Example 2 | Comparative Example 3 |
|---|---|---|---|---|---|---|
| Inherent viscosity after solid-state polymerization (dL/g) | 0.880 | 0.867 | 1.109 | 0.951 | 0.982 | 0.792 |
| Zero shear viscosity after solid-state polymerization (Pa · s) | 210 | 470 | 657 | 83.4 | 90.6 | 73.3 |

As shown in Table 1, the zero shear viscosity after solid state polymerization of Examples 1 to 3 were significantly higher than that of Comparative Example 1, which explained that the SPG monomer significantly increased the zero shear viscosity of the polyester after solid-state polymerization, thereby achieving an excellent processability of the polyester. Furthermore, the inherent viscosities of the products after solid-state polymerization were increased whether the SPG monomer was added or not. However, only those Examples utilizing the SPG monomer may achieve excellent zero shear viscosity. For example, the spiro-compound (not the spiro-diol) in Comparative Example 2 cannot achieve an excellent zero shear viscosity.

Example 4

1 part by mole of dimethyl furan-2,5-dicarboxylate, 2.5 parts by mole of ethylene glycol, 1500 ppm of SPG monomer (on the weight basis of the dimethyl furan-2,5-dicarboxylate, about 0.09069 mol %), and 100 ppm of titanium-based solid catalyst (C-94, commercially available from World Chem Industries Co., Ltd, on the weight basis of the dimethyl furan-2,5-dicarboxylate) were put into a reaction tank. A condensing device and a methanol collecting cylinder were assembled with the reaction tank. The reaction tank was flushed and filled with nitrogen, and the mixture was heated to 190° C. in a salt bath, and stirred at 200 rpm by a rotator to perform a transesterification. After the catalyst was completely dissolved, methanol started to condense on the condenser. The transesterification was performed continuously for 3 hours, the condensed methanol was removed, and 0.1 wt % of an anti-oxidant (Irganox 1010, commercially available from BASF, on the weight basis of the dimethyl furan-2,5-dicarboxylate) was then added into the reaction tank. The pressure of the reaction tank was then gradually reduced to 50 torr in 30 minutes to remove the excess ethylene glycol. The salt bath temperature was gradually heated to 230° C., and the reaction pressure was gradually reduced to less than 1 torr to perform a condensation polymerization for 60 minutes. Finally, the vacuum of the condensation polymerization was broken by nitrogen, and the heating and stirring were stopped. The cap of the reaction tank was then opened, and a viscous product was then obtained.

The viscous product was re-crystallized at 150° C. for 1 hour, then crushed by a crushing machine, and then separated by a sieve screen to collect powder with a particle size of less than 25 mesh for a further solid-state polymerization. 6 g of the powder was put into a reaction tank, and heated to 200° C. in a salt bath to perform the solid-state polymerization for 24 hours, in which the reaction pressure was less than 1 torr. Finally, a branched polyester was obtained, and its properties such as viscosity and rheological behavior were analyzed and are tabulated in Table 2.

Example 5

Example 5 was similar to Example 4, and the difference in Example 5 was in the SPG monomer amounts. The SPG monomer amount and the product properties are tabulated in Table 2.

Comparative Example 4

Comparative Example 4 was similar to Comparative Example 1, and the difference in Comparative Example 4 was that the solid-state polymerization period was reduced to 24 hours. The product properties are tabulated in Table 2.

TABLE 2

| | Example 4 | Example 5 | Comparative Example 4 |
|---|---|---|---|
| SPG monomer(ppm) | 1500 | 2000 | 0 |
| Solid-state polymerization period (hrs) | 24 | 24 | 24 |
| Inherent viscosity of the polyester before solid-state polymerization (dL/g) | 0.255 | 0.267 | 0.253 |
| Inherent viscosity of the polyester after solid-state polymerization (dL/g) | 0.686 | 0.418 | 0.724 |
| Zero shear viscosity after solid-state polymerization (Pa · s) | 112 | 410 | 35.6 |

As shown in Table 2, the zero shear viscosities of the products in Examples 4 and 5 were significantly higher than that of the product in Comparative Example 4. The SPG monomer may greatly increase the zero shear viscosity of the polyester after the solid-state polymerization, such that the polyester with the SPG monomer may have excellent processability.

Comparative Example 5

Comparative Example 5 was similar to Example 2, and the differences were that the solid-state polymerization period was reduced to 24 hours, and the SPG monomer was replaced with pentaerythritol (PENTA). The product properties are tabulated in Table 3

TABLE 3

|  | Comparative Example 5 |
|---|---|
| SPG monomer (ppm) | 1000 (PENTA) |
| Polyol monomer | Ethylene glycol |
| Solid-state polymerization period (hrs) | 24 |
| Inherent viscosity of the polyester before solid-state polymerization (dL/g) | 0.250 |
| Inherent viscosity of the polyester after solid-state polymerization (dL/g) | Gel |
| Zero shear viscosity after solid-state polymerization (Pa · s) | NA |

As shown in Table 3, the SPG monomer was replaced with PENTA in Comparative Example 5, thereby resulting a gelled product In the Examples of the disclosure, the diacid monomer, the esterified diacid monomer, or a combination thereof, the SPG monomer and the polyol monomer can be mixed together thoroughly and then be reacted to obtain the polyester having an excellent zero shear viscosity and the reaction was free of gelation.

Example 6

1 part by mole of dimethyl furan-2,5-dicarboxylate, 2.5 parts by mole of 1,3-propylene glycol, 1000 ppm of SPG monomer (on the weight basis of the dimethyl furan-2,5-dicarboxylate, about 0.06046 mol %), and 200 ppm of titanium-based solid catalyst (C-94, commercially available from World Chem Industries Co., Ltd, on the weight basis of the dimethyl furan-2,5-dicarboxylate) were put into a reaction tank. A condensing device and a methanol collecting cylinder were assembled with the reaction tank. The reaction tank was flushed and filled with nitrogen, and the mixture was heated to 190° C. in a salt bath, and stirred at 200 rpm by a rotator to perform transesterification. After the catalyst was completely dissolved, methanol started to condense on the condenser. The transesterification was performed continuously for 3 hours, the condensed methanol was removed, and 0.1 wt % of an anti-oxidant (Irganox 1010, commercially available from BASF, on the weight basis of the dimethyl furan-2,5-dicarboxylate) was then added into the reaction tank. The pressure of the reaction tank was then gradually reduced to 50 torr in 30 minutes to remove the excess 1,3-propylene glycol. The salt bath temperature was gradually heated to 230° C., and the reaction pressure was gradually reduced to less than 1 torr to perform a condensation polymerization for 180 minutes. Finally, the vacuum of the condensation polymerization was broken by nitrogen, and the heating and stirring were stopped. The cap of the reaction tank was then opened, and a viscous product was then obtained.

The viscous product was re-crystallized at 120° C. for 1 hour, then crushed by a crushing machine, and then separated by a sieve screen to collect powder with a particle size of less than 25 mesh for a further solid-state polymerization. 6 g of the powder was put into a reaction tank, and heated to 160° C. in a salt bath to perform the solid-state polymerization for 48 hours, in which the reaction pressure is less than 1 torr. Finally, a branched polyester was obtained, and its properties such as viscosity and rheological behavior were analyzed and are tabulated in Table 3.

Comparative Example 6

Comparative Example 6 was similar to Example 6, and the difference in Comparative Example 6 was free of the SPG monomer. The product properties are tabulated in Table 4.

TABLE 4

|  | Example 6 | Comparative Example 6 |
|---|---|---|
| SPG monomer (ppm) | 1000 | 0 |
| Polyol monomer | 1,3-propylene glycol | 1,3-propylene glycol |
| Solid-state polymerization period (hrs) | 48 | 48 |
| Inherent viscosity of the polyester before solid-state polymerization (dL/g) | 0.480 | 0.450 |
| Inherent viscosity of the polyester after solid-state polymerization (dL/g) | 1.260 | 0.774 |
| Zero shear viscosity after solid-state polymerization (Pa · s) | 9,500 | 920 |

As shown in Table 4, the zero shear viscosity of the product in Example 6 was significantly higher than that of the product in Comparative Example 6. The SPG monomer may greatly increase the zero shear viscosity of the polyester after the solid-state polymerization, such that the polyester with the SPG monomer may have excellent processability.

Example 7

Example 7 was similar to Example 6, and the differences were that the 1,3-propylene glycol was replaced with 1,4-butylene glycol, and the condensation polymerization was performed at 240° C. The product properties are listed in Table 5.

TABLE 5

|  | Example 7 |
|---|---|
| SPG monomer (ppm) | 1000 |
| Polyol monomer | 1,4-butylene glycol |
| Solid-state polymerization period (hrs) | 48 |
| Inherent viscosity of the polyester before solid-state polymerization (dL/g) | 0.826 |
| Inherent viscosity of the polyester after solid-state polymerization (dL/g) | 0.937 |
| Zero shear viscosity after solid-state polymerization (Pa · s) | 315 |

As shown in Table 5, the polyester after solid-state polymerization had an excellent zero shear viscosity when the polyol was butylene glycol.

Comparative Example 7

Comparative Example 7 was similar to Example 2, and the difference in Comparative Example 7 was that the furan-2,5-dicarboxylate and the ethylene glycol were melt polymerized, and then melt blended with the SPG monomer to perform the solid-state polymerization for 24 hours. The polyester before the solid-state polymerization with the SPG monomer had an inherent viscosity of 0.394 dL/g, and the polyester after the solid-state polymerization with the SPG monomer had an inherent viscosity of 0.538 dL/g. The polyester properties are tabulated in Table 6.

TABLE 6

|  | Comparative Example 7 |
|---|---|
| SPG monomer (ppm) | 1000 |
| Solid-state polymerization period (hrs) | 24 |
| Inherent viscosity of the polyester before solid-state polymerization (dL/g) | 0.394 |

TABLE 6-continued

|  | Comparative Example 7 |
| --- | --- |
| Inherent viscosity of the polyester after solid-state polymerization (dL/g) | 0.538 |
| Zero shear viscosity after solid-state polymerization (Pa · s) | 81.8 |

Example 8

1 part by mole of dimethyl furan-2,5-dicarboxylate, 2.5 parts by mole of ethylene glycol, 1000 ppm of SPG monomer (on the weight basis of the dimethyl furan-2,5-dicarboxylate, about 0.06046 mol %), and 100 ppm of titanium-based solid catalyst (C-94, commercially available from World Chem Industries Co., Ltd, on the weight basis of the dimethyl furan-2,5-dicarboxylate) were put into a reaction tank. A condensing device and a methanol collecting cylinder were assembled with the reaction tank. The reaction tank was flushed and filled with nitrogen, and the mixture was heated to 190° C. in a salt bath, and stirred at 200 rpm by a rotator to perform transesterification. After the catalyst was completely dissolved, methanol started to condense on the condenser. The transesterification was performed continuously for 5 hours, the condensed methanol was removed, and 0.1 wt % of an anti-oxidant (Irganox 1010, commercially available from BASF, on the weight basis of the dimethyl furan-2,5-dicarboxylate) was then added into the reaction tank. The pressure of the reaction tank was then gradually reduced to 50 torr in 30 minutes to remove the excess ethylene glycol. The salt bath temperature was gradually heated to 230° C., and the reaction pressure was gradually reduced to less than 1 torr to perform a condensation polymerization for 60 minutes. Finally, the vacuum of the condensation polymerization was broken by nitrogen, and the heating and stirring were stopped. The cap of the reaction tank was then opened, and a viscous product was then obtained.

The viscous product was re-crystallized at 150° C. for 90 minutes, then crushed by a crushing machine, and then separated by a sieve screen to collect powder with a particle size of less than 25 mesh for a further solid-state polymerization. The powder was put into a reaction tank, and heated to 200° C. in a salt bath to perform the solid-state polymerization for 24 hours, in which the reaction pressure is less than 1 torr. Finally, a branched polyester was obtained, and its inherent viscosity was analyzed (about 0.51 dL/g).

The polyester was heated to 260° C. and melted, and then melt spun at an extrusion rate of 13.4 g/min through a nozzle with 24 holes. A PET spin finish (20%) was used to oil the spinning process, and the oiling amount was 0.316 cc/min. The spinning was performed under nitrogen to form fibers. Subsequently, the cooled and cured fibers were collected at a winding rate of 600 m/minute, thereby obtaining a fiber bound of 201 denier/24 filament for property tests. The fiber bound was stretched further at 100° C., and properties of the stretched fiber bound was analyzed as shown in Table 7. The extrusion rate and the winding rate were measured to calculate the fiber weight of 9000 m, thereby obtaining a linear density of the fiber. The fiber strength and the breaking elongation of the fiber was analyzed by a tensile testing machine USTER URT4. The melting point and the crystallinity of the fiber were analyzed by a differential scanning calorimeter Q20 (commercially available from TA), in which the sample was heated at a rate of 10° C./min under nitrogen.

Example 9

The polyester was prepared using a method similar to that in Example 8, and the difference in Example 9 was that the solid-state polymerization period was changed to 30 hours, and the polyester had an inherent viscosity of about 0.55 dL/g. The polyester was heated to 260° C. and melted, and then melt spun by an extrusion rate of 13.4 g/min through a nozzle with 24 holes. A PET spin finish (20%) was used to oil the spinning process, and the oiling amount was 0.316 cc/min. The spinning was performed under nitrogen to form fibers. Subsequently, the cooled and cured fibers were collected at a winding rate of 600 m/minute, thereby obtaining a fiber bound of 201 denier/24 filament for property tests. The fiber bound was stretched further at 100° C., and properties of the stretched fiber bound was analyzed as shown in Table 7.

Example 10

The polyester was prepared using a method similar to that in Example 8, and the difference in Example 10 was that the solid-state polymerization period was changed to 36 hours, and the polyester had an inherent viscosity of about 0.60 dL/g. The polyester was heated to 260° C. and melted, and then melt spun at an extrusion rate of 13.7 g/min through a nozzle with 24 holes. A PET spin finish (20%) was used to oil the spinning process, and the oiling amount was 0.316 cc/min. The spinning was performed under nitrogen to form fibers. Subsequently, the cooled and cured fibers were collected at a winding rate of 600 m/minute, thereby obtaining a fiber bound of 206 denier/24 filament for property tests. The fiber bound was stretched further at 100° C., and properties of the stretched fiber bound was analyzed as shown in Table 7.

Example 11

The polyester was prepared using a method similar to that in Example 8, and the difference in Example 11 was that the solid-state polymerization period was changed to 36 hours, and the polyester had an inherent viscosity of about 0.61 dL/g. The polyester was heated to 270° C. and melted, and then melt spun at an extrusion rate of 14 g/min through a nozzle with 24 holes. A PET spin finish (20%) was used to oil the spinning process, and the oiling amount was 0.316 cc/min. The spinning was performed under nitrogen to form fibers. Subsequently, the cooled and cured fibers were collected at a winding rate of 400 m/minute, thereby obtaining a fiber bound of 316 denier/24 filament for property tests. The fiber bound was stretched further at 100° C., and properties of the stretched fiber bound was analyzed as shown in Table 7.

Comparative Example 8

The polyester was prepared using a method similar to that in Example 8, and the difference in Comparative Example 8 was that no SPG monomer was used, and the polyester had an inherent viscosity of about 0.58 dL/g. The polyester was heated to 260° C. and melted, and then melt spun at an extrusion rate of 13.5 g/min through a nozzle with 24 holes. A PET spin finish (20%) was used to oil the spinning process, and the oiling amount was 0.316 cc/min. The spinning was performed under nitrogen to form fibers. Subsequently, the cooled and cured fibers were collected at a winding rate of 600 m/minute, thereby obtaining a fiber bound for property tests. The fiber bound was stretched further at 100° C., and properties of the stretched fiber bound was analyzed as shown in Table 7.

TABLE 7

| | Inherent viscosity (dL/g) | Winding rate (m/min) | Stretch ratio | Linear density (d.p.f) | Fiber strength (gF/den) | Breaking elongation (%) | Crystallinity (J/g) | Melting point |
|---|---|---|---|---|---|---|---|---|
| Example 8 | 0.51 | 600 | 0 | 8.38 | 1.32 | 192 | Not analyzed | Not analyzed |
| | | | 2 | 4.19 | 1.19 | 19.62 | 21.2 | 216.6/224.85 |
| Example 9 | 0.55 | 600 | 0 | 8.38 | 1.60 | 146 | Not analyzed | Not analyzed |
| | | | 2 | 4.19 | 2.86 | 14.45 | 46.7 | 217.26/225.56 |
| Example 10 | 0.60 | 600 | 0 | 8.58 | 1.69 | 162.08 | Not analyzed | Not analyzed |
| | | | 2.2 | 3.9 | 3.3 | 15.74 | 55.6 | 219.3/229.35 |
| | | | 2.3 | 3.73 | 3.43 | 15.06 | Not analyzed | Not analyzed |
| Example 11 | 0.61 | 400 | 0 | 13.2 | 1.29 | 203.2 | Not analyzed | Not analyzed |
| | | | 2.3 | 5.72 | 1.7 | 17.95 | 25.8 | 215.81 |
| Comparative Example 8 | 0.58 | 600 | 0 | 8.44 | 0.82 | 2.95 | Not analyzed | Not analyzed |
| | | | 2 | 4.22 | 0.59 | 1.94 | 7.43 | 214.62 |

As shown in Table 7, the fiber strength and the breaking elongation of the fibers before and after the stretching step in Examples utilizing the SPG monomer are obviously higher than those in Comparative Example 8 without the SPG monomer. In addition, the crystallinity of the fibers in Examples was greatly enhanced by the stretching step, which means the SPG monomer being beneficial to form branched structures of the polyester. The molecular chains of the polyester were blocked by the branched structures. As such, a heterogeneous nucleation mechanism was occurred after stretching the fiber, thereby accelerating the crystallization rate of the fiber during the stretching step. The molecular weight (or inherent viscosity) of the polyester was gradually increased along the solid-state polymerization period increase, such that the branching degree was gradually increased. As a result, the fiber strength was obviously enhanced.

The thermal properties of the stretched fiber was analyzed by DSC, and the fibers in Examples (utilizing the SPG monomer) had two obvious melting peaks. It means that the branched structure formed by the SPG monomer have two different crystalline phases during the stretching of the fiber. The higher melting point may be a result of the close packed polyester molecular chains of the heterogeneous nucleation.

The initial winding rate for collecting the fibers also obviously influenced the fiber strength. The fibers were respectively collected by the winding rate of 600 m/min and 400 m/min in Examples 10 and 11. The higher winding rate corresponded to the higher fiber strength. Even though the fiber collected by the lower winding rate was stretched further, it could not achieve similar fiber strength. Accordingly, the fiber strength of the fiber modified by the SPG monomer could be enhanced by increasing the winding rate.

Example 12

The polyester was prepared using a method similar to that in Example 8, and the difference in Example 12 was that the ethylene glycol was replaced with 1,4-butylene glycol, and the polyester had an inherent viscosity of about 0.716 dL/g. The polyester was heated to 245° C. and melted, and then melt spun at an extrusion rate of 11.8 g/min through a nozzle with 24 holes. A PET spin finish (20%) was used to oil the spinning process, and the oiling amount was 0.316 cc/min. The spinning was performed under nitrogen to form fibers. Subsequently, the cooled and cured fibers were collected at a winding rate of 600 m/minute, thereby obtaining a fiber bound of 177 denier/24 filament for property tests. The fiber bound was stretched further at 100° C., and properties of the stretched fiber bound was analyzed as shown in Table 8.

Comparative Example 9

The polyester was prepared using a method similar to that in Example 12, and the difference in Comparative Example 9 was that no SPG monomer was used, and the polyester had an inherent viscosity of about 0.784 dL/g. The polyester was heated to 245° C. and melted, and then melt spun at an extrusion rate of 11.8 g/min through a nozzle with 24 holes. A PET spin finish (20%) was used to oil the spinning process, and the oiling amount was 0.316 cc/min. The spinning was performed under nitrogen to form fibers. Subsequently, the cooled and cured fibers were collected at a winding rate of 600 m/minute, thereby obtaining a fiber bound of 177 denier/24 filament for property tests. The fiber bound was stretched further at 100° C., and properties of the stretched fiber bound was analyzed as shown in Table 8.

TABLE 8

| | Inherent viscosity (dL/g) | Winding rate (m/min) | Stretch ratio | Linear density (d.p.f) | Fiber strength (gF/den) | Breaking elongation (%) | Crystallinity (J/g) | Melting point |
|---|---|---|---|---|---|---|---|---|
| Example 12 | 0.716 | 600 | 3 | 2 | 2.4 | 45.8 | 40.47 | 174.68 |
| | | | 3.2 | 2.2 | 2.61 | 29.79 | 43.35 | 174.58 |
| | | | 3.4 | 2.2 | 2.51 | 24.65 | Not analyzed | Not analyzed |

TABLE 8-continued

|  | Inherent viscosity (dL/g) | Winding rate (m/min) | Stretch ratio | Linear density (d.p.f) | Fiber strength (gF/den) | Breaking elongation (%) | Crystallinity (J/g) | Melting point |
|---|---|---|---|---|---|---|---|---|
| Comparative Example 9 | 0.784 | 600 | 3 3.2 | 2.5 2.3 | 1.97 2.68 | 34.16 29.95 | Not analyzed 41.92 | Not analyzed 174.53 |

As shown in Table 8, the fiber stretched by a stretch ratio of 3 had a higher fiber strength and a higher breaking elongation, even the fiber with the branched structure had a lower viscosity. The SPG monomer used to form the branched structure may also enhance the mechanical properties of the fiber. The fiber with the branched structure had a higher stretch ratio (e.g. 3.4 times). The fiber that was not modified with the SPG monomer had a higher viscosity, however its stretch ratio was only 3.2.

Example 13

The polyester was prepared using a method similar to that in Example 8, and the difference in Example 13 was that the ethylene glycol was replaced with propylene glycol, the solid-state polymerization period was 24 hours, and the polyester had an inherent viscosity of about 0.883 dL/g. The polyester was heated to 245° C. and melted, and then melt spun at an extrusion rate of 13.2 g/min through a nozzle with 24 holes. A PET spin finish (20%) was used to oil the spinning process, and the oiling amount was 0.316 cc/min. The spinning was performed under nitrogen to form fibers. Subsequently, the cooled and cured fibers were collected at a winding rate of 500 m/minute, thereby obtaining a fiber bound of 237 denier/24 filament for property tests. The fiber bound was left to stand at room temperature for a while, and then shrunk to a fiber bound of 320 denier/24 filament. The fiber bound was stretched further at 110° C. at a stretching rate of 3 m/min, and properties of the stretched fiber bound was analyzed as shown in Table 9.

Example 14

The polyester was prepared using a method similar to that in Example 13, and the difference in Example 14 was that the solid-state polymerization period was changed to 36 hours, and the polyester had an inherent viscosity of about 1.2 dL/g. The polyester was heated to 255° C. and melted, and then melt spun at an extrusion rate of 13.2 g/min through a nozzle with 24 holes. A PET spin finish (20%) was used to oil the spinning process, and the oiling amount was 0.316 cc/min. The spinning was performed under nitrogen to form fibers. Subsequently, the cooled and cured fibers were collected at a winding rate of 600 m/minute, thereby obtaining a fiber bound of 191 denier/24 filament for property tests. The fiber bound was left to stand at room temperature for a while, and then shrunk to a fiber bound of 427 denier/24 filament. The fiber bound was stretched further at 110° C. at a stretching rate of 3 m/min, and properties of the stretched fiber bound was analyzed as shown in Table 9.

Comparative Example 10

The polyester was prepared using a method similar to that in Example 13, and the difference in Comparative Example 10 was that no SPG monomer was used and no solid-state polymerization was performed, and the polyester had an inherent viscosity of about 0.774 dL/g. The polyester was heated to 245° C. and melted, and then melt spun at an extrusion rate of 13.9 g/min through a nozzle with 24 holes. A PET spin finish (20%) was used to oil the spinning process, and the oiling amount was 0.316 cc/min. The spinning was performed under nitrogen to form fibers. Subsequently, the cooled and cured fibers were collected at a winding rate of 600 m/minute, thereby obtaining a fiber bound for property tests. It was intended to further stretch the fiber bound at 110° C. at a stretching rate of 3 m/min, but the fiber bound was broken right at initial stretching. In short, the fiber bound could not be stretched.

TABLE 9

|  | Inherent viscosity (dL/g) | Winding rate (m/min) | Stretch ratio | Linear density (d.p.f) | Fiber strength (gF/den) | Breaking elongation (%) | Crystallinity (J/g) | Melting point |
|---|---|---|---|---|---|---|---|---|
| Example 13 | 0.883 | 500 | 0 | 13.33 | 0.45 | 1.87 | 0.42 | 175.31 |
|  |  |  | 1.3 | 10.26 | 0.60 | 147.2 | 5.78 | 175.25 |
|  |  |  | 1.69 | 7.89 | 1.18 | 146.6 | 3.4 | 175.56 |
| Example 14 | 1.20 | 600 | 0 | 8.71 | 0.55 | 2.79 | 1.23 | 172.43 |
|  |  |  | 1.3 | 13.71 | 0.95 | 94.27 | 5.84 | 172.67 |
|  |  |  | 1.69 | 10.63 | 1.08 | 87.27 | 5.51 | 175.22 |
|  |  |  | 2.2 | 8.79 | 1.33 | 79.08 | 9.09 | 172.22 |
| Comparative Example 10 | 0.774 | 600 | 0 | 8.125 | 0.5 | 1.93 | 3.23 | 175.63 |

As shown in Table 9, the fiber collected at a winding rate lower than 600 m/min had a relatively low fiber strength and breaking elongation. Although the branched polyester had a higher viscosity, the fiber collected by a lower winding rate still had a lower fiber strength. The fiber collected at the lower winding rate (e.g. 500 m/min) in Example 13 had a fiber strength lower than that of the fiber in Comparative Example 10 (having a lower viscosity and not modified with the SPG monomer). This result matched the previous Examples, in which the polyester fiber collected at a lower winding rate had a lower fiber strength. In addition, the stretching step may enhance fiber strength. The polyester fiber not modified with the SPG monomer in Comparative Example 10 cannot be stretched to enhance its fiber strength due to lack of extensibility. The polyester fiber having the branched structure in Examples 13 and 14 could be stretched at a low stretching rate (e.g. 3 m/min). The higher stretching ratio (note that the stretching ratio is not the stretching rate) resulted in a higher fiber strength. Moreover, the breaking elongation of the fiber was also obviously enhanced by stretching. Accordingly, the branched structure from the SPG monomer may improve the polyester fiber properties.

As known from above Examples and Comparative Examples, the branched structure formed by adding the SPG monomer could greatly enhance the strength and breaking elongation of the fiber. In addition, the polyester fiber with branched structure could overcome the low tangling density of the polyester material, thereby enhance the mechanical properties of the fiber. In addition, the addition of the SPG monomer may reduce the solid-state polymerization period of preparing the polyester, and also mitigate the color phase-shift problem caused by the high-temperature, long-period of polymerization.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A fiber, comprising:
a polyester copolymerized of a diacid monomer, an esterified diacid monomer, or a combination thereof with a polyol monomer,
wherein the diacid monomer, the esterified diacid monomer, or a combination thereof consists essentially of (1) furan dicarboxylic acid, dialkyl furandicarboxylate, or a combination thereof or (2) furan dicarboxylic acid, dialkyl furandicarboxylate, or a combination thereof and spiro-diacid, and
the polyol monomer comprises (3) $C_2$-$C_{14}$ polyol or (4) $C_2$-$C_{14}$ polyol and spiro-diol, wherein the spiro-diol has a Formula (I):

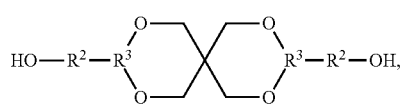

and the spiro-diacid has a Formula (II):

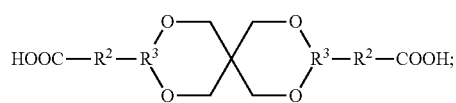

wherein each $R^2$ is independently single bond,

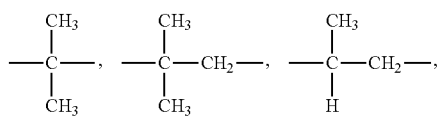

or $C_1$-$C_4$ linear alkylene;

each $R^3$ is independently

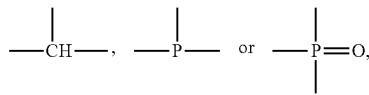

and
wherein the diacid monomer, the esterified diacid monomer, or a combination thereof and the polyol monomer meet the following conditions: (a) the diacid monomer, the esterified diacid monomer or a combination thereof comprises (2) furan dicarboxylic acid, dialkyl furandicarboxylate, or a combination thereof and spiro-diacid, (b) the polyol monomer comprises (4) $C_2$-$C_{14}$ polyol and spiro-diol, or (c) a combination thereof,
wherein the polyester has an inherent viscosity at 30° C. of 0.5 dL/g to 1.5 dL/g, and
wherein when the diacid monomer, the esterified diacid monomer, or the combination thereof includes 1 part by mole of (1) furan dicarboxylic acid, dialkyl furandicarboxylate, or the combination thereof, and the polyol monomer includes 1 to 3 parts by mole of (4) $C_2$-$C_{14}$ polyol and spiro-diol, an amount of the spiro-diol is 500 ppm to 2000 ppm based on a weight of the furan dicarboxylic acid, dialkyl furandicarboxylate, or the combination thereof, and
wherein when the diacid monomer, the esterified diacid monomer, or the combination thereof includes 1 part by mole of (2) furan dicarboxylic acid, dialkyl furandicarboxylate, or the combination thereof and spiro-diacid, and the polyol monomer includes 1 to 3 parts by mole of (3) $C_2$-$C_{14}$ polyol, an amount of the spiro-diacid is 500 ppm to 2000 ppm based on a weight of the furan dicarboxylic acid, dialkyl furandicarboxylate, or the combination thereof.

2. The fiber as claimed in claim 1, having a breaking elongation of 5% to 250%.

3. The fiber as claimed in claim 1, having a crystallinity of 5 J/g to 60 J/g.

4. The fiber as claimed in claim 1, wherein the furan dicarboxylic acid includes 2,5-furan dicarboxylic acid, 3,4-furan dicarboxylic acid, 2,3-furan dicarboxylic acid, or a combination thereof.

5. The fiber as claimed in claim 1, wherein the dialkyl furandicarboxylate includes dimethyl furan-2,5-dicarboxylate, dimethyl furan-3,4-dicarboxylate, dimethyl furan-2,3-dicarboxylate, or a combination thereof.

6. The fiber as claimed in claim 1, wherein the $C_2$-$C_{14}$ polyol includes ethylene glycol, 1,3-propylene glycol, glycerol, 1,4-butylene glycol, 1,5-pentylene glycol, neo-pentylene glycol, 1,6-hexylene glycol, 1,7-heptylene glycol, 1,8-octylene glycol, 1,9-nonylene glycol, decylene glycol, undecylene glycol, dodecylene glycol, tetradecylene glycol, rosin glycol, isosorbide, 2,5-furandiol, or a combination thereof.

7. A method of manufacturing the fiber according to claim 1, comprising:
mixing a diacid monomer, an esterified diacid monomer, or a combination thereof with a polyol monomer to perform an esterification and a condensation polymerization for forming a prepolymer;
performing a solid-state polymerization of the prepolymer to form the polyester; and
spinning the polyester to form a fiber, wherein the diacid monomer, the esterified diacid monomer, or a combination thereof consists essentially of (1) furan dicarboxylic acid, dialkyl furandicarboxylate, or a combination thereof or (2) furan dicarboxylic acid, dialkyl furandicarboxylate, or a combination thereof and spiro-diacid, and the polyol monomer comprises (3) $C_2$-$C_{14}$ polyol or (4) $C_2$-$C_{14}$ polyol and spiro-diol, wherein the spiro-diol has a Formula (I):

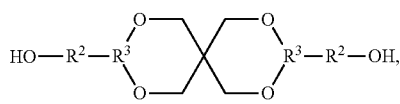

(I)

and the spiro-diacid
has a Formula (II):

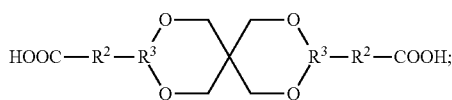

wherein each $R^2$ is independently single bond,

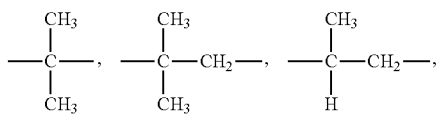

or $C_1$-$C_4$ linear alkylene;
each $R^3$ is independently

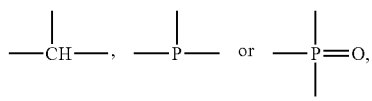

and
wherein the diacid monomer, the esterified diacid monomer, or a combination thereof and the polyol monomer meet the following conditions:
(a) the diacid monomer, the esterified diacid monomer or a combination thereof comprises (2) furan dicarboxylic acid, dialkyl furandicarboxylate, or a combination thereof and spiro-diacid,
(b) the polyol monomer comprises (4) $C_2$-$C_{14}$ polyol and spiro-diol, or
(c) a combination thereof,
wherein the polyester has an inherent viscosity at 30° C. of 0.5 dL/g to 1.5 dL/g, and
wherein when the diacid monomer, the esterified diacid monomer, or the combination thereof includes 1 part by mole of (1) furan dicarboxylic acid, dialkyl furandicarboxylate, or the combination thereof, and the polyol monomer includes 1 to 3 parts by mole of (4) $C_2$-$C_{14}$ polyol and spiro-diol, an amount of the spiro-diol is 500 ppm to 2000 ppm based on a weight of the furan dicarboxylic acid, dialkyl furandicarboxylate, or the combination thereof, and
wherein when the diacid monomer, the esterified diacid monomer, or the combination thereof includes 1 part by mole of (2) furan dicarboxylic acid, dialkyl furandicarboxylate, or the combination thereof and spiro-diacid, and the polyol monomer includes 1 to 3 parts by mole of (3) $C_2$-$C_{14}$ polyol, an amount of the spiro-diacid is 500 ppm to 2000 ppm based on a weight of the furan dicarboxylic acid, dialkyl furandicarboxylate, or the combination thereof.

8. The method as claimed in claim 7, further comprising a step of collecting the fiber at a winding rate of 100 m/min to 3000 m/min.

9. The method as claimed in claim 7, further stretching the fiber at 60° C. to 150° C., and the stretched fiber has a length 1.1 to 5 times that of the fiber before the stretching step.

10. The method as claimed in claim 7, wherein the fiber has a breaking elongation of 5% to 250%.

11. The method as claimed in claim 7, wherein the fiber has a crystallinity of 5 J/g to 60 J/g.

12. The method as claimed in claim 7, wherein the furan dicarboxylic acid includes 2,5-furan dicarboxylic acid, 3,4-furan dicarboxylic acid, 2,3-furan dicarboxylic acid, or a combination thereof.

13. The method as claimed in claim 7, wherein the dialkyl furandicarboxylate includes dimethyl furan-2,5-dicarboxylate, dimethylfuran-3,4-dicarboxylate, dimethyl furan-2,3-dicarboxylate, or a combination thereof.

14. The method as claimed in claim 7, wherein the $C_2$-$C_{14}$ polyol includes ethylene glycol, 1,3-propylene glycol, glycerol, 1,4-butylene glycol, 1,5-pentylene glycol, neo-pentylene glycol, 1,6-hexylene glycol, 1,7-heptylene glycol, 1,8-octylene glycol, 1,9-nonylene glycol, decylene glycol, undecylene glycol, dodecylene glycol, tetradecylene glycol, rosin glycol, isosorbide, 2,5-furandiol, or a combination thereof.

* * * * *